Nov. 19, 1946. J. P. BUTTERFIELD 2,411,364
FASTENING DEVICE
Filed July 6, 1942

INVENTOR
JOHN P. BUTTERFIELD
BY
ATTORNEYS

Patented Nov. 19, 1946

2,411,364

UNITED STATES PATENT OFFICE 2,411,364

FASTENING DEVICE

John P. Butterfield, Highland Park, Mich., assignor to Chrysler Corporation, Highland Park, Mich., a corporation of Delaware Application July 6, 1942, Serial No. 449,867

10 Claims. (Cl. 85—9)

This invention relates to fastening or securing devices for connecting together component parts of machines, machine elements, or other structures and to improved methods of forming such devices or parts thereof. My invention is especially advantageous for connecting together the bearing portions of an engine connecting rod, especially for aircraft engines wherein maximum strength and minimum weight are essential.

My invention is especially directed to the anchoring connection between the tie bolt and one of the bearing portions of a connecting rod, usually the main body portion, for holding or anchoring the bolt against turning relative to the connecting rod portions, and to improved methods of forming such anchoring connections.

It is an object of my invention to provide an anchoring connection resulting in a connecting rod assembly having improved characteristics of light weight and improved strength, also in a novel method of forming the parts of my anchoring connection.

Another object is to provide an anchoring connection so constructed as to avoid sharp corners in the parts forming the connection; a connection of simplified construction capable of being manufactured in a simpler manner than is possible with anchoring devices heretofore employed.

Further objects and advantages reside in the novel combination and arrangement of parts more particularly hereinafter described and claimed, reference being had to the accompanying drawing in which:

Figure 4:
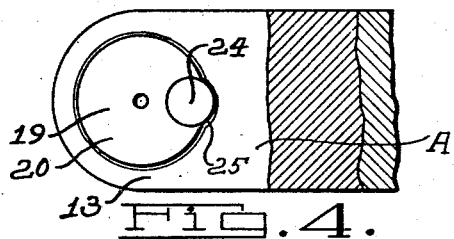
Fig. 4 is a top plan view taken as indicated by line 4—4 of Fig. 3.
Figure 3:
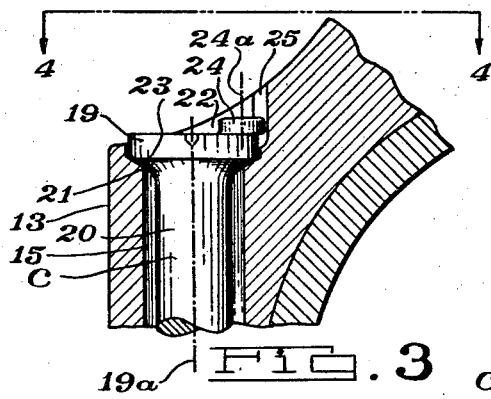
Fig. 3 is an enlarged sectional view of a portion of the Fig. 1 connecting rod taken to illustrate my fastening device.
Figure 1:
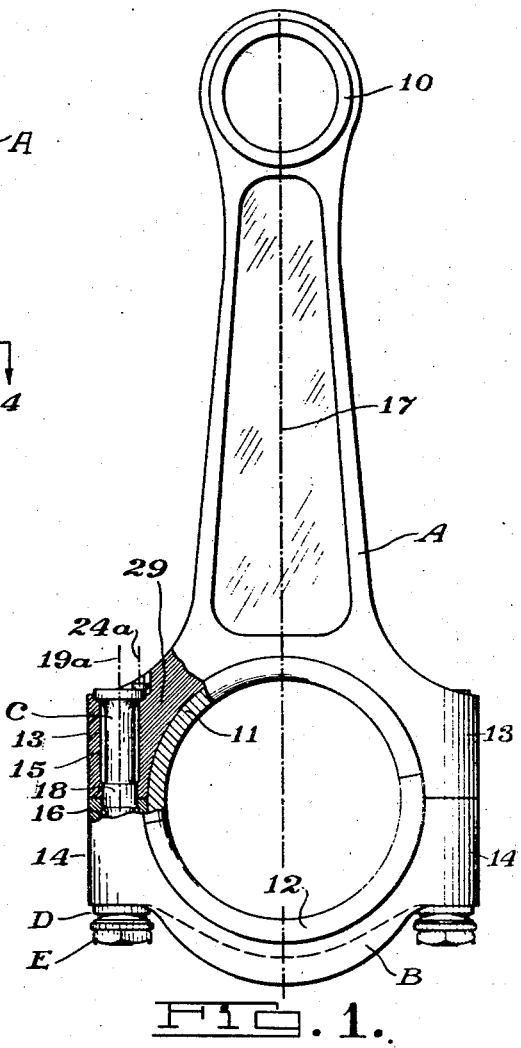
Fig. 1 is a front elevational view of a connecting rod assembly with parts broken away to show my fastening device applied thereto.

Referring to the drawing I have illustrated my invention as applied to an aircraft engine connecting rod having a main body portion A and bearing cap B. The portion A has the usual piston pin bearing portion 10 at one end and a semi-bearing portion 11 at the other end for receiving the customary crankshaft throw. A companion semi-bearing 12 is formed in cap B, it being desired to tightly assemble the cap B and portion A together as illustrated in Fig. 1 by utilizing body A as an abutment and cap B as a reaction-taking member.

The portion A and cap B are formed with pairs of relatively abutting bosses 13 and 14 respectively formed with openings 15 and 16 aligned with each other in the direction of the longitudinal axis 17 of the connecting rod. As the two fastening devices at the opposite sides of the rod are identical, the description of one will serve to illustrate the complete assembly.

A bolt C extends through aligned openings 15 and 16 and may be provided with an intermediate pilot portion 18 engaging portions of these openings adjacent the face engagement of bosses 13 and 14. At its upper end the bolt C is provided with my novel anchoring means for holding the bolt against rotation and at its lower end the bolt is provided with a nut D of any type suitable for tensioning the bolt so as to draw the parts A and B tightly together. A lock nut E prevents undesired backing-off of the nut D during normal use of the connecting rod.

At its upper end the bolt C has an enlarged cylindrical primary head 19 concentric with the axis 19ª of the body portion 20 of the bolt and joined thereto with the frusto-conical shoulder portion 21. The opening 15 is enlarged at its upper end at 22 to receive the bolt head 19, the portions 15 and 22 being connected by a complementary frusto-conical seat 23 for the bolt shoulder portion 21. Integrally formed with the bolt head 19 is a disc-like lug or button 24 upstanding from the upper face of the bolt head and so disposed as to overhang the same locally at one point or region in the periphery of the bolt head.

The button 24 is of cylindrical formation having its axis 24ª parallel with the axis of the body portion 20 and head portion 19 of bolt C. The diameter of the button 24 is substantially less than that of head portion 19. The overhanging portion of the button 24, which is a segment of the cylindrical button, projects into a groove 25 of rod portion A. This groove extends in the direction of the rod axis 17 and is arcuate in cross-section to fit the side walls of the segmental overhanging portion of button 24 and to allow ready installation of the bolt C axially downwardly in opening 15. Preferably, the groove 25 is of cylindrical formation such that its arcuate wall is substantially concentric with the axis 24ª of button 24. The terminal enlarged portion of opening 15 thus comprises bounding wall portions formed at 22 and also by the wall of groove 25 which locally interrupts the wall 22.

My bolt anchoring device may be produced by very simple machining methods. For example, the rod portion A may be drilled along axis 24a to form a cylindrical opening, a portion of which provides the groove 25. Then the main opening 22 is bored along axis 19a and the seat 23 formed. The opening 15 may be formed at any desired stage in the machining of rod portion A. If desired the openings 15 and 22 as well as seat 23 may obviously be formed by a single tool operation.

Figure 6:
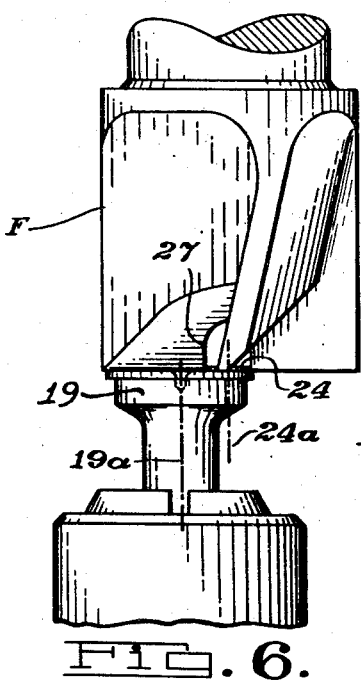
Fig. 6 is an elevational view of the anchoring end of the bolt illustrating the method of machining the anchoring means.
Figures 2, 5:
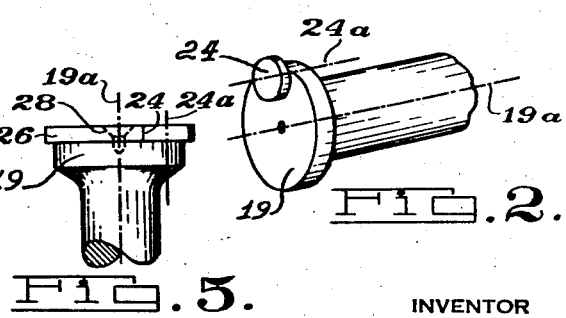
Fig. 2 is a perspective view of the anchoring end of the bolt shown in Fig. 1.
Fig. 5 is an elevational view of the anchoring end of the bolt prior to machining to form the anchoring means.

In machining the upper end portion of bolt C, this bolt is preferably initially formed with a secondary head portion 26 from which the button 24 is formed. The head 26 is cylindrical and overlies the primary head 19, being of a diameter greater than that of head 19 by an amount sufficient to form the button. In machining the head 26, I use an end milling tool F operating along axis 24a. This tool is hollow at 27 so as to form the button 24 while facing off the remaining portion of head 26. In Fig. 5 I have illustrated the bolt upper end prior to the end milling operation, the bolt centering hole being shown at 28 and the button 24 being shown in construction lines. In Fig. 6 I have shown the tool F during the milling operation in forming the button 24.

In the assembly of the connecting rod, the parts A and B are assembled together with the bolts C such that the button 24 of each bolt engages an associated groove 25 thereby anchoring the bolts against turning on their respective axes 19a. With each bolt seated at 23, the nut D is applied to the lower threaded end of the bolt and turned to apply the desired tension to the bolt after which the locking nut E is applied to maintain the assembled relationship. Further details of the nut D and its associated locking means are illustrated and claimed in the copending application of Alexander G. Herreshoff, Serial No. 449,868, filed July 6, 1942.

All references to terminology of position or location, such as used in my specification and claims, is employed in a relative sense for convenience and clarity of expression as obviously the connecting rod and its parts may extend in any direction other than that illustrated.

In my fastening device I have provided parts which do not have sharp corners which have, with structures used heretofore, been difficult to machine and which have tended to fail under the severe stresses imposed during assembly of the connecting rod and operation thereof in the engine. Furthermore, my arrangement provides more metal, for a given overall size of connecting rod and bearing diameter, between the bearing opening at 11 and the bolt anchoring connection, this region, designated at 29 in Fig. 1 being critical with respect to failure of connecting rods in general.

I claim:

1. In a fastening device for a pair of members having aligned openings, a bolt extending through said openings for holding said members in assembled relationship, said bolt having a coaxial and integral cylindrical head and shank, an annular member clamping surface on the underside of said head substantially concentric and coextensive with said head, and a disc-like lug integral with said head and upstanding therefrom and disposed to one side of the axis of the bolt such that a portion of said lug locally overhangs said head, the opening of one of said members having an enlarged portion thereof receiving said head and a groove locally recessed therefrom for receiving said overhanging lug portion.

2. In a fastening device according to claim 1, the enlarged portion of said opening being substantially the size of said head and the groove being substantially the size and shape of the overhanging lug portion.

3. In a fastening device for a pair of members having aligned openings, a bolt extending through said openings for holding said members in assembled relationship, the opening of one of said members being terminally enlarged presenting a bounding wall portion therefor of approximate cylindrical formation concentric with the axis of this opening, said bounding wall portion being interrupted by a groove formed therein in the direction of said axis and presenting a second bounding wall portion for said enlarged opening of approximate cylindrical formation eccentric with respect to said axis, said bolt having coaxial and integral head and shank portions, said head portion fitting in the first said bounding wall portion and having a member clamping surface substantially concentric with said head for seating in said opening and said head being provided with an integral cylindrical button projecting outwardly from said head portion and laterally into said groove for anchoring said bolt from rotation, the axis of said button being eccentric with respect to the axis of said opening.

4. In a fastening device for a pair of members, a bolt for fastening said members together, said bolt having coaxial and integral head and shank portions, said head portion being formed with an annular member clamping surface substantially concentric and coextensive with said head and with an integral disc-like button upstanding therefrom, said button having a diameter materially less than that of said head, the axes of said head and button extending in the general direction of the axis of said bolt and relatively offset in relation to each other such that a portion of said button of approximate cylindrical formation overhangs said head, one of said members having a groove receiving said overhanging portion of said button for rotatably anchoring said bolt with said one member.

5. In a fastening device according to claim 4, said groove being of approximate cylindrical formation about an axis substantially coincident with the axis of said button.

6. A bolt for connecting members together comprising, a head and a shank integral with said head, said head having an annular member clamping surface concentric therewith and said head being formed with an upstanding integral dis-like button axially spaced from said surface, said button having a diameter substantially less than that of said head and having its axis offset with respect to the axis of said head so that a minor portion of said button of approximate cylindrical formation overhangs said head adjacent a region of the periphery of said head and said shank including a threaded portion adapted for receiving a cooperating threaded clamping element.

7. In a fastening device for a pair of members, one of said members having a bolt-receiving opening terminally enlarged, said enlargement being locally interrupted by a groove formed in said one member, a bolt in said opening, said bolt having a head substantially the size of said enlargement disposed therein and having a shank coaxial and integral with said head, and said head having an integral upstanding disc-like button locally overhanging its periphery for engaging in and substantially fitting said groove so as to rotatably anchor the bolt with respect to said one member, the walls of said enlargement and groove being defined by portions of intersecting cylinders of relatively different diameters in which the axes of the cylinders are substantially parallel and spaced apart from each other.

8. A bolt for connecting members together comprising a cylindrical head and coaxial integral shank, said head having an annular clamping surface of substantially uniform width concentric and coextensive therewith, and having a lateral projection integral therewith of relatively small cylindric formation as compared to said head axially paralleling said head and axially offset from said clamping surface for restraining rotation of said bolt when in use, and said shank including a threaded portion adapted for receiving a cooperating threaded clamping element.

9. A bolt for connecting members together comprising a cylindrical head and coaxial integral shank, said head having an annular tapered clamping surface of substantially uniform width concentric and coextensive therewith and having a lateral projection integral therewith of relatively small cylindric formation as compared to said head axially paralleling said head and axially offset from said clamping surface for restraining rotation of said bolt when in use, and said shank including a threaded portion adapted for receiving a cooperating threaded clamping element.

10. A bolt for connecting members together comprising a cylindrical head and coaxial integral shank, said head having an annular clamping surface of substantially uniform width concentric and coextensive therewith, and having a lateral upstanding button-like projection integral therewith of relatively small cylindric formation as compared to said head axially paralleling said head and axially offset from said clamping surface for restraining rotation of said bolt when in use, and said shank including a threaded portion adapted for receiving a cooperating threaded clamping element.

JOHN P. BUTTERFIELD.